(12) United States Patent
Tavernese, Jr.

(10) Patent No.: US 8,280,029 B1
(45) Date of Patent: Oct. 2, 2012

(54) CUSTOMER SERVICE RESPONSE SYSTEM FOR INTERACTION WITH CUSTOMER SERVICE AGENTS

(75) Inventor: Peter Tavernese, Jr., Kings Park, NY (US)

(73) Assignee: Avaya Inc., Basking Ridge, NJ (US)

( * ) Notice: Subject to any disclaimer, the term of this patent is extended or adjusted under 35 U.S.C. 154(b) by 2344 days.

(21) Appl. No.: 09/745,305

(22) Filed: Dec. 21, 2000

(51) Int. Cl.
*H04M 3/00* (2006.01)
*H04M 5/00* (2006.01)

(52) U.S. Cl. ......... 379/265.01; 379/265.02; 379/265.09; 379/265.11; 379/309

(58) Field of Classification Search ............. 379/265.01, 379/265.02, 265.09, 265.11, 309
See application file for complete search history.

(56) References Cited

U.S. PATENT DOCUMENTS

| | | | | |
|---|---|---|---|---|
| 5,163,081 A * | 11/1992 | Wycherley et al. | ............. | 379/52 |
| 5,327,486 A * | 7/1994 | Wolff et al. | ................ | 379/93.23 |
| 5,526,417 A * | 6/1996 | Dezonno | ................... | 379/88.22 |
| 5,870,454 A * | 2/1999 | Dahlen | ....................... | 379/88.14 |
| 5,884,032 A * | 3/1999 | Bateman et al. | ............ | 709/204 |
| 5,946,386 A * | 8/1999 | Rogers et al. | ............ | 379/265.09 |
| 6,064,730 A * | 5/2000 | Ginsberg | ................. | 379/265.09 |
| 6,396,920 B1 * | 5/2002 | Cox et al. | ................. | 379/266.02 |
| 6,628,755 B2 * | 9/2003 | Shimada et al. | ............. | 379/9.04 |
| 6,687,241 B1 * | 2/2004 | Goss | ............................ | 370/352 |

\* cited by examiner

*Primary Examiner* — Quynh Nguyen
(74) *Attorney, Agent, or Firm* — Maldjian Law Group LLC; John P. Maldjian, Esq.; Alexander D. Walter, Esq.

(57) ABSTRACT

The invention provides a customer service response system (CSRS), that a customer service agent can selectively employ to simultaneously interact with one or more customers. When a caller places a telephone call to the customer service call center, the CSRS answers the call and plays a message to the calling party. The message may be a greeting message and may prompt the calling party for information such as a claim number. The CSRS then displays this information on a graphical user interface at the call center. The customer service agent in front of the GUI can answer the call, or can respond to the caller with a question by clicking a button on the GUI.

28 Claims, 2 Drawing Sheets

CUSTOMER SERVICE RESPONSE SYSTEM FOR INTERACTION WITH CUSTOMER SERVICE AGENTS

FIELD OF THE INVENTION

This invention relates generally to customer service response systems, and more particularly to a customer service response system which enables a customer service agent to selectively automate a portion of the response.

BACKGROUND OF THE INVENTION

Modern companies have limited interaction with most consumers. Generally, consumer contact is limited to customer service phone calls placed by the consumer. As such, it is prudent business to provide prompt, efficient service to consumers placing these customer service phone calls. Long delays in receiving help may sour the consumer towards the company, which, in some cases, may result in lost profits.

Therefore, many companies have been implementing customer service response systems to automate the customer service process to increase the promptness and efficiency of the customer service call center. These response systems gather preliminary information from a caller and subsequently pass the information to a customer service agent. Unfortunately, these systems leave much to be desired. These systems are usually pre-programmed to obtain specific information, and the customer service agent has no control over the information acquired. Further, once the automated system has collected the preliminary information, and passed it on to the customer service agent, it ceases to operate, requiring the customer service agent to handle only one caller at a time. This requires companies to spend resources hiring and training extra customer service agents and still results in long wait times.

It would thus be beneficial to have a customer service response system with which a customer service agent can interact, thereby allowing the agent greater freedom to obtain the information necessary for prompt and expedient customer service.

SUMMARY OF THE INVENTION

The present invention provides a customer service response system (CSRS) which provides the ability to simultaneously communicate with multiple customers.

An embodiment of the invention provides a call center that includes a customer service response system (CSRS) capable of responding to an incoming telephone call from a calling party by playing a message to the calling party and a graphical user interface (GUI) in electrical communication with the CSRS. The GUI is configured to receive and display information from the CSRS. The information received from said CSRS originates from the calling party.

According to another aspect of the invention there is provided a method of servicing a call at a call center. The method includes receiving information from a caller at a customer service response system (CSRS). The information is displayed on a graphical user interface (GUI). A call service agent employs the GUI to prompt the CSRS to send a message to the caller, and the CSRS transmits the message for receipt by the caller.

According to still another aspect of the invention, there is provided a call center that includes a call system response (CSR) module configured to receive information from multiple telephone calls. The call center also includes a graphical user interface (GUI) module in electrical communication with the CSR module. The GUI module is configured to display the information received from the telephone calls. The GUI module is also configured to initiate a response to the information.

Another aspect of the invention provides a call center that includes a customer service response system (CSRS) capable of simultaneously responding to multiple incoming telephone calls from multiple calling parties. The CSRS plays a message for receipt by each of the calling parties. The call center also includes a graphical user interface (GUI) in electrical communication with the CSRS and configured to display information from the CSRS that originated from at least one of the calling parties. The CSRS includes voice recognition software. Information from at least one of the calling parties is received by the CSRS as a voice signal. The voice recognition software converts the voice signal into a text message for display on the GUI.

The invention will next be described in connection with certain illustrated embodiments and practices. However, it will be clear to those skilled in the art that various modifications, additions and subtractions can be made without departing from the spirit or scope of the claims.

DETAILED DESCRIPTION OF THE INVENTION

The present invention provides a customer service response system (CSRS) which a customer service agent can selectively employ to simultaneously interact with one or more customers.

Figure 1:
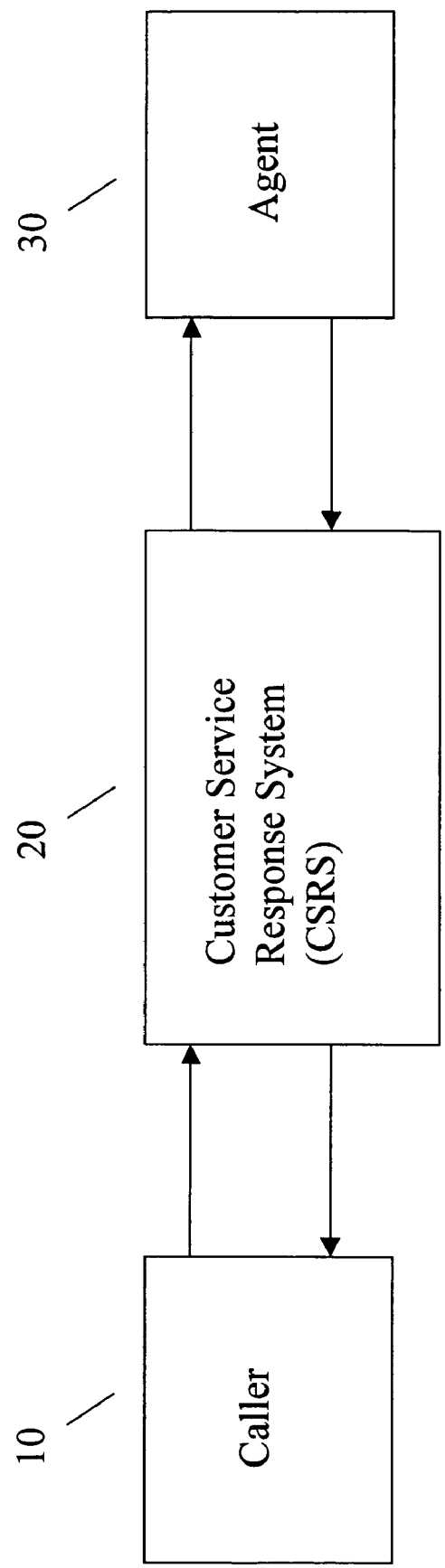
FIG. 1 illustrates one embodiment of the present invention.

FIG. 1 illustrates a block diagram of a typical interaction when a call is placed to a customer service call center which utilizes the present invention. A caller 10 places a phone call to the customer service call center, which employs the CSRS 20. Upon receiving the phone call, the CSRS 20 may answer the call. In an embodiment of the invention the customer service agent may answer the call directly at the customer service agents option (e.g. if there are very few incoming calls, etc.). Although this option is not required by the invention.

When the CSRS 20 answers the call, it may play a greeting, such as the name of the company. The CSRS 20 may also provide automated menu information. For example, it may provide the caller 10 with the option of listening to his current balance, placing an order, speaking to a customer service agent, contacting a specific extension, or some other options.

Depending on the option chosen by the caller 10, the CSRS 20 may prompt the caller for preliminary information. For example, it may prompt the caller for an account number, a name, etc. The caller 10 may provide this information using the touch-tone keypad. The CSRS 20 may have voice-recognition software, which is capable of translating the caller's voice signals into digital information. Thus, the caller 10 may also provide this information simply by speaking the caller's name, account number, etc. into the telephone. The CSRS 20 may repeat the inputted information to the caller 10 to ascertain whether it has been correctly entered into the system (although not required). If the inputted information was not correctly entered into the system, the caller 10 may be provided with an option to re-input the information.

The CSRS 20 may pass the caller's information to the customer service agent 30, or it may act upon the information. For example, if the caller 10 is attempting to purchase an item by phone. After the caller 10 selects the purchase and inputs a credit card number, the CSRS 20 may contact a credit card authorization center located outside the customer service call center to obtain authorization for such a payment. If authorization is granted, the CSRS 20 may simply forward a message to the agent 30 signifying "approved", thereby shielding the caller's credit number from the agent 30 and providing greater security. Alternatively, the CSRS 20 may simply provide the approval to the customer, thereby eliminating the customer service representative completely. Additionally, the CSRS 20 may forward the call to the appropriate person. For example, the caller may be seeking employment in which case the CSRS 20 could forward the call to the Human Resources department instead of to the customer service agent.

Figure 2:
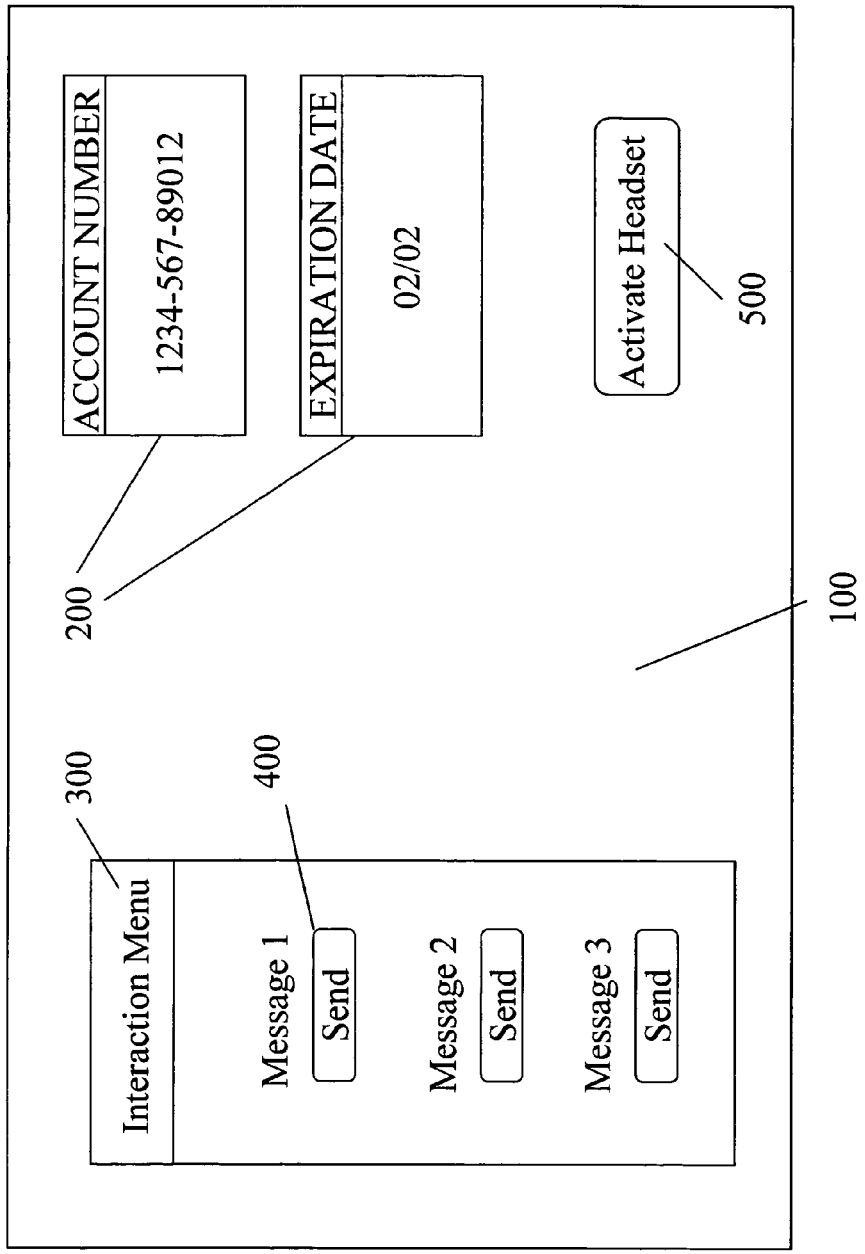
FIG. 2 illustrates a computer display that can be viewed by a customer service agent.

As illustrated in FIG. 2, inputted information, passed from the CSRS 20 to the agent 30, may appear on the agent's computer display 100. The inputted information may appear as a pop up window 200 or it may appear in a default window that has been previously opened. This information may include account number, expiration date, name, etc.

Rather than speak to a customer immediately, however, the agent 30 may continue to utilize the CSRS 20 through a Graphic User Interface (GUI) on a telephone, computer, or telephone adjunct device. For example, the GUI may include an agent interaction menu 300 that includes a list of stock, customized, or customizable messages 400 which the agent 30 can transmit to the caller 10. For example, by pressing a graphical button or a soft-key associated with one message, the agent 30 may prompt the caller 10 for the caller's mother's maiden name. The CSRS 20 will then voice-prompt the caller 10 to provide his/her mother's maiden name. Such a voice prompt may be in a computerized voice, in the agent's voice, in a third party's voice or in some combination thereof. Once the caller speaks the name (or other requested information), or keys it in using the telephone keypad, into the telephone, the CSRS 20 may forward the information to the agent 30 as a sound file, or it may use its voice-recognition software to convert the information and forward it as digital information in a pop-up window 100 or in the default window. The interaction menu 300 may provide other message options as well. For example, a typical question asked by customer service agents is "How may we assist you today?" Such a question may be sent to the caller 10 as a prompt simply by choosing the appropriate button in the interaction menu 300 on the GUI. Because the agent 30 may retrieve information simply by interacting with the GUI rather than through an involved telephone conversation, the agent 30 may simultaneously service multiple callers. For example, the customer service agent could send a prompt to one or more customers while speaking with another customer, could broadcast the same prompt to multiple callers, etc.

The GUI menu may also have a button 500 so that the agent's headset or telephone is activated, allowing the agent to verbally communicate with the caller. It may also have a button to de-activate the agent's headset or telephone.

Those skilled in the art will note that the CSRS 20 may also be used in Internet chat sessions. Since the agent 30 may prompt the caller 10 via a GUI menu rather than typing the information manually, an agent 30 is better equipped to handle multiple chat sessions. For example, the agent's GUI 100 may be partitioned into several windows, each window containing individual pop-up windows with information for the different callers 10.

Additionally, the invention may be provided in a scaled down version as a home call screening device for people who wish to avoid annoying tele-marketers. It would allow the called party to determine who was calling and avoid the awkwardness of trying to figure out how to say no even when the telemarketer uses a hard sell approach.

The following claims are intended to cover all of the generic and specific features of the invention described herein, and all statements of the scope of the invention which, as a matter of language, might be said to fall there between.

Having described the invention, what is claimed is:

1. Apparatus for caller information retrieval comprising:
   a customer service response system (CSRS) capable of responding to an incoming telephone call from a calling party by playing a message to said calling party;
   a graphical user interface (GUI) electrically coupled to said CSRS and configured to receive and display information from said CSRS;
   wherein said information received from said CSRS originates from said calling party; and
   voice recognition software included within said CSRS,
   wherein at least a portion of the information from at least one of said calling parties is received by said CSRS as a voice signal,
   wherein said voice recognition software is configured to convert said voice signal into a text message,
   wherein via a soft-key or graphical button, said GUI is configured to selectively initiate another message being sent from said CSRS to said calling party.

2. The apparatus for caller information retrieval according to claim 1 wherein said GUI displays a plurality of possible messages that may be sent from said CSRS to said calling party.

3. The apparatus for caller information retrieval according to claim 2 wherein at least one of said plurality of messages is customizable.

4. The apparatus for caller information on retrieval according to claim 1 wherein said message is capable of being displayed on said GUI.

5. The apparatus for caller information retrieval according to claim 1 wherein said CSRS further includes a voice recognition program which is capable of converting text messages into voice signals.

6. The apparatus for caller information retrieval according to claim 1 wherein said GUI provides an option for bypassing said CSRS.

7. The apparatus for caller information retrieval according to claim 1 wherein said CSRS is an adjunct to a telephone.

8. The apparatus for caller information retrieval according to claim 1 wherein said CSRS is capable of responding to a plurality of incoming telephone calls from a plurality of calling parties by playing a message to each of said calling parties.

9. The apparatus for caller information retrieval according to claim 1 wherein said CSRS is configured to receive voice and text messages.

10. The apparatus for caller information retrieval according to claim 1 wherein said message is a voice message.

11. The apparatus for caller information retrieval according to claim 1 wherein said message is a text message.

12. The apparatus for caller information retrieval according to claim 1 wherein said message is a multimedia message.

13. The apparatus for caller information retrieval of claim 1 wherein said CSRS is further capable of accessing a remote computer system in response to receipt of said information.

14. The apparatus for caller information retrieval of claim 1 wherein said CSRS is further capable of forwarding said incoming call to another telephone number in response to receipt of said information from said calling party.

15. A method of servicing a call at a call center comprising:
receiving information from a calling party at a customer service response system (CSRS), wherein at least a portion of the information from said calling party is received by said CSRS as a voice signal;
recognizing the voice signal by use of voice recognition software included within said CSRS, wherein said voice recognition software is configured to convert said voice signal into a text message;
displaying said information on a graphical user interface (GUI);
employing a graphical button or soft-key on said GUI to prompt said CSRS to send a message to said calling party; and
transmitting said message for receipt by said calling party.

16. The method according to claim 15 further comprising selectively initiating from said GUI another message being sent from said CSRS to said calling party.

17. The method according to claim 15 further comprising displaying on said GUI a plurality of possible messages that may be sent from said CSRS to said calling party.

18. The method according to claim 17 further comprising customizing at least one of said plurality of messages.

19. The method according to claim 15 wherein the text message is capable of being displayed on said GUI.

20. The method according to claim 15 further comprising converting a text message displayed on said GUI into a voice message for transmission to said calling party.

21. The method according to claim 15 further comprising bypassing said CSRS and connecting said incoming telephone call to a telephone at said call center.

22. The method according to claim 15 further comprising said CSRS responding to a plurality of incoming telephone calls from a plurality of calling parties by playing a message to each of said calling parties.

23. The method according to claim 15 further comprising receiving at said CSRS at least one voice message and at least one text message.

24. The method according to claim 15 further comprising said CSRS accessing a remote computer system in response to receipt of said information from said calling party.

25. The method according to claim 15 further comprising said CSRS forwarding said incoming telephone call to another telephone number in response to receipt of said information from said calling party.

26. A call center comprising:
call system response (CSR) means for receiving a plurality of telephone calls, each telephone call providing information originating from a respective calling party, and for playing a message in response to receipt of information originating from at least one of said calling parties;
graphical user interface (GUI) means coupled to said CSR means for displaying said information originating from at least one of said calling parties; and
voice recognition software included within said CSRS,
wherein at least a portion of the information from at least one of said calling parties is received by said CSRS as a voice signal,
wherein said voice recognition software is configured to convert said voice signal into a text message for display on said GUI, and
wherein said GUI means includes a graphical button or soft-key for initiating a customized response to said information originating from said at least one of said calling parties.

27. A call center comprising:
a customer service response system (CSRS) capable of simultaneously responding to a plurality of incoming telephone calls from a plurality of calling parties by playing a message for receipt by each of said calling parties;
a graphical user interface (GUI) electrically coupled to said CSRS, configured to display information from said CSRS that originated from at least one of said plurality of calling parties and to display at least one custom message which is selectable for playing with a graphical button or a soft-key; and,
voice recognition software included within said CSRS;
wherein information from at least one of said calling parties is received by said CSRS as a voice signal;
wherein said voice recognition software is configured to convert said voice signal into a text message for display on said GUI.

28. The call center according to claim 26 wherein said GUI means is further configured to display a plurality of messages, each selectable by a graphical button or a soft-key, that may be sent from said CSR to said calling party.

\* \* \* \* \*